United States Patent
Fung

(12) 
(10) Patent No.: US 6,289,796 B1
(45) Date of Patent: Sep. 18, 2001

(54) HOT MILK DISPENSER

(75) Inventor: Chi Chung Fung, Chai Wan (HK)

(73) Assignee: Simatelex Manufactory Company Limited (HK)

( * ) Notice: Subject to any disclaimer, the term of this patent is extended or adjusted under 35 U.S.C. 154(b) by 0 days.

(21) Appl. No.: 09/791,467

(22) Filed: Feb. 23, 2001

(51) Int. Cl.[7] .............................. A47J 31/24; A47J 31/40; A47J 31/41; A47J 31/46; A47J 43/12
(52) U.S. Cl. ........................... 99/453; 99/275; 99/293; 99/323.1; 99/452
(58) Field of Search ................. 99/452–454, 275–279, 99/323.1–323.3, 281–286, 289 R, 291, 293–295, 300, 302 R; 137/595, 863, 889, 873; 141/70, 82; 261/76, 78.1, 119.1, 121.1, DIG. 16, DIG. 76; 366/101, 163.1, 163.2, 167.1; 392/386, 396

(56) References Cited

U.S. PATENT DOCUMENTS

| | | | |
|---|---|---|---|
| 4,585,357 | * | 4/1986 | Ogata ................................. 99/452 X |
| 4,715,274 | * | 12/1987 | Paoletti .................................. 99/454 |
| 4,735,133 | * | 4/1988 | Paoletti .................................. 99/454 |
| 4,800,805 | * | 1/1989 | Mahlich et al. ........................ 99/293 |
| 4,852,473 | * | 8/1989 | Azpitarte Bolivar ................... 99/293 |
| 4,922,810 | * | 5/1990 | Siccardi ............................... 99/323.1 |
| 4,949,631 | * | 8/1990 | Fregnan ................................. 99/452 |
| 5,052,289 | * | 10/1991 | Di Girolamo .......................... 99/452 |
| 5,154,112 | * | 10/1992 | Wettern ............................... 99/323.1 |
| 5,295,431 | * | 3/1994 | Schiettecatte et al. ................. 99/293 |
| 5,335,588 | * | 8/1994 | Mahlich ................................. 99/293 |
| 5,423,245 | * | 6/1995 | Midden ................................. 99/275 |
| 5,464,574 | * | 11/1995 | Mahlich ............................... 261/124 |

* cited by examiner

Primary Examiner—Timothy F. Simone
(74) Attorney, Agent, or Firm—Jackson Walker L.L.P.

(57) ABSTRACT

A single unit milk dispenser for producing hot frothed milk or hot non-frothed milk uses milk and steam. A reservoir supplies milk via an adjustable valve to a first chamber. For supplying frothed milk, steam is issued from a first steam outlet nozzle and mixes and froths with the milk in the first chamber and in an expansion chamber before being dispensed out of a collection chamber. For non-frothed milk, steam supplied from a second steam outlet nozzle is released to mix and swirl around with cold milk fed from the reservoir into the collection chamber. The rate of flow of milk out of the reservoir is normally adjusted for the two mode of operation, which mode is simply otherwise determined by which nozzle supplies steam, by turning a steam supply selection knob.

5 Claims, 3 Drawing Sheets

HOT MILK DISPENSER

BACKGROUND OF THE INVENTION

1. Field of the Invention

The invention relates to hot milk dispensers.

2. Description of Prior Art

The invention relates more particularly to dispensing hot milk in a kitchen or cafe outlet. It is usual to have such a dispenser for use with and often incorporated in a coffee maker, or similar. Typically, this enable cappuccino coffee or similar beverages to be mixed up or dispensed at a common location.

It is well-known to prepare frothed milk by flowing steam from a nozzle in to a surface of cold milk in a vessel and skilfully moving the vessel up and down relative to the end of the nozzle. It is also known to heat up milk by immersing and keeping the nozzle below the surface of cold milk to prepare hot milk that is not frothed. Non-frothed milk should have no foaming at the surface of the milk and be generally hot enough not to affect any coffee that it is added to, for example. In any event, although the same equipment may be used for producing hot frothed milk or hot non-frothed milk, nozzle adjustments, often manually controlled, must be made during or for producing one or the other.

SUMMARY OF THE INVENTION

It is an object of the invention to overcome or at least reduce this problem.

According to the invention there is provided a single unit milk dispenser for producing hot frothed milk and hot non-frothed milk using milk and steam, the dispenser comprising a reservoir for containing a supply of milk, means for supplying steam under pressure, a first chamber, an adjustable valve to allow a flow milk into the first chamber, a first aperture in the base of the first chamber, a first steam outlet nozzle directed towards the first aperture to blow the milk from the first chamber into an expansion chamber where the milk is frothed by the steam, a second aperture in the base of the expansion chamber leading to a collection chamber for collecting frothed milk that exits from the expansion chamber, and a dispensing outlet at the base of the collection chamber, a flow passage between the adjustable valve and the expansion chamber to allow milk to be supplied from the reservoir into the expansion chamber, a second steam outlet nozzle for supplying steam under pressure directed across the collection chamber above the dispensing outlet to swirl and heat milk passing through the second valve towards the dispensing outlet, means for selectively supplying steam either to the first steam outlet nozzle for providing hot frothed milk at the dispensing outlet or to the second steam outlet nozzle for providing hot-non-frothed milk at the dispensing outlet.

The flow passage preferably comprises the first aperture, the first chamber, and the second aperture.

The second aperture is preferably formed in a raised central part of a closure base plate that tends to cause the frothed milk to swirl around inside the base of the expansion chamber.

The second steam outlet nozzle may be mounted next to the first steam outlet nozzle and a flow passage provided between the second nozzle and an aperture in a side of collection chamber.

The aperture in the side of the collection chamber is preferably provided in a side of a hollow cylinder surrounded by a compartment to allow steam and milk to swirl both around in the collection chamber and in the compartment.

BRIEF DESCRIPTION OF THE DRAWINGS

A single unit dispenser for producing either hot frothed milk or hot non-frothed milk at a common dispensing nozzle will now be described by way of example with reference to the accompanying drawings in which.

DESCRIPTION OF THE PREFERRED EMBODIMENTS

Figure 1:
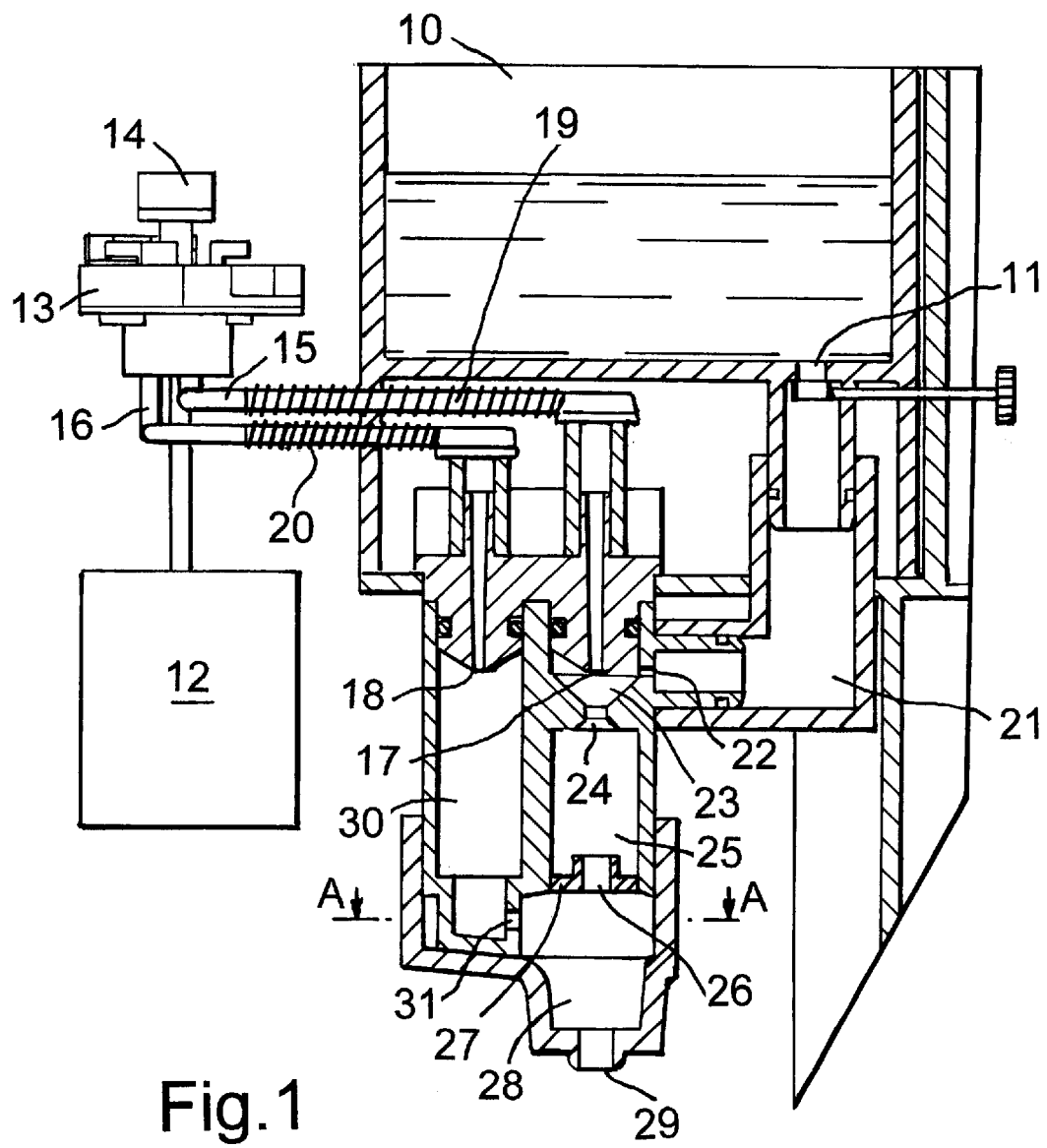
FIG. 1 is a part-sectional elevation of the dispenser.

Referring to the drawings, in FIG. 1 a milk reservoir 10 has a restricted manually adjustable outlet valve 11. A steam generator 12 supplies steam to a selector valve 13 with a rotary manual selector knob 14 that can be turned to direct steam, when required, to either outlet pipe 15 or 16. The pipes 15 and 16 are connected respectively to supply first and second steam outlet nozzles 17 and 18 via flexible hoses 19 and 20.

An L-shaped milk passage 21 extends from the outlet valve 11 to a small aperture 22 in a side of an upper chamber 23 where in use low pressure steam from the nozzle 18 mixes with milk fed from the reservoir 10. Opposite the nozzle 17 in a base of the chamber 23 is an aperture 24 leading to a lower frothing chamber 25. A lower exit of the chamber is provided by an aperture 26 in a central raised boss of a closure base plate 27. The presence of the plate 27 and raised boss tends to cause the steam and milk mixture to swirl around in a turbulent manner inside the chamber 25 to enhance froth formation. A collection chamber 28 below the chamber 25 collects the froth which can be dispensed via a dispensing outlet 29.

Figure 3:
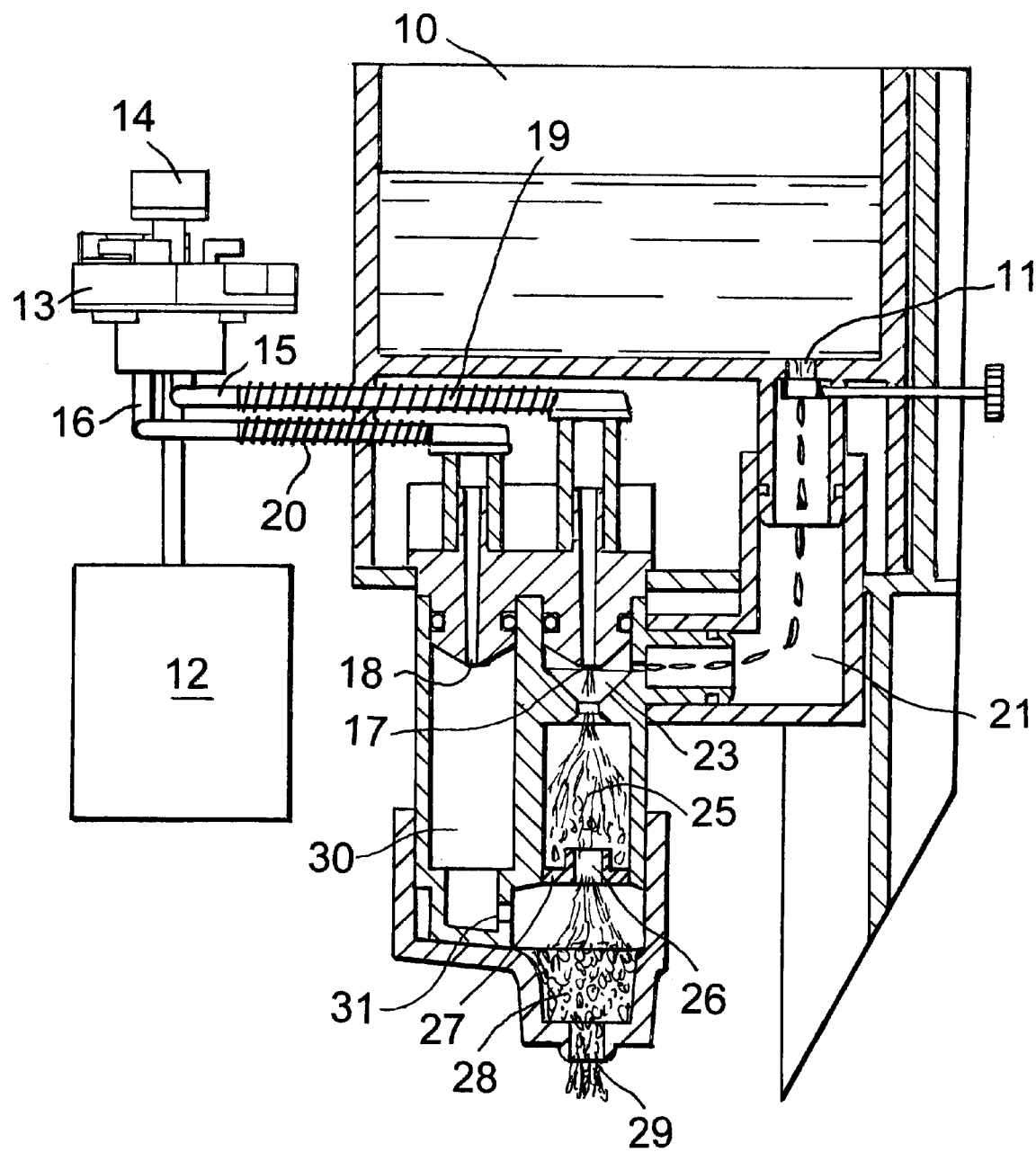
FIG. 3 shows a part-section elevation of the dispenser in a first mode for producing hot frothed milk.
Figure 4:
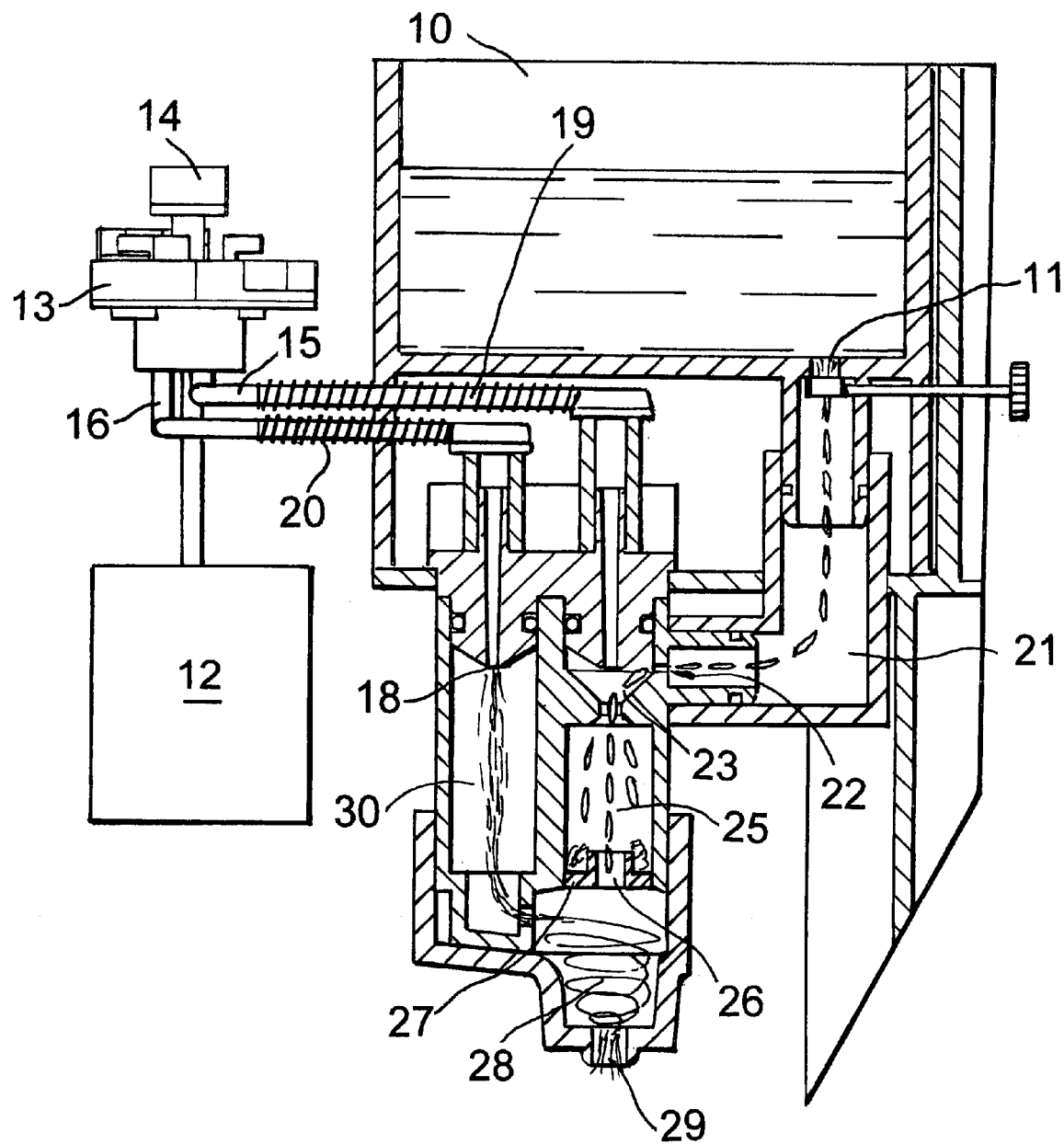
FIG. 4 shows a part-section elevation of the dispenser for producing hot non-frothed milk.

Thus, if the knob 14 is moved to a position to select hot frothed milk and steam is supplied to the nozzle 17, the dispenser will automatically start and continue to provide frothed milk at the outlet 29. It will be noted that the valve 11 is also opened to allow milk to be drawn out of the reservoir by a partial vacuum created by the flow of steam out of the nozzle 17. The dispensing of frothed milk is illustrated in FIG. 3.

Figure 2:
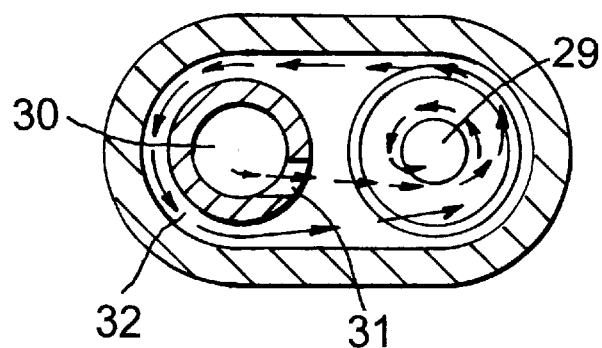
FIG. 2 is a cross-section taken through A—A of FIG. 1.

If the knob 14 is moved to a position to select hot non-frothed milk, steam will be released into the dispenser via the nozzle 18 into a steam passage 30. The passage 30 leads to an aperture 31 for directing a stream of low pressure steam laterally across the chamber 28 between the aperture 26 and the dispensing outlet 29. It will normally be necessarily to open the valve 11 when the dispenser is set to produce non-frothed milk. The aperture 31 is centrally off-set (as seen in FIG. 2) so that the steam tends to swirl with milk flowing slowly out of the nozzle 26 in a descending helix. This action also tends to decelerate the normal downward flow rate of the milk to provide for more time for the steam to heat the milk. This also reduces the degree of formation of foam otherwise caused by a fast jet of steam or steam-milk mixture out of the dispensing outlet 29 into a container, for example a cup placed under the outlet 29. The steam also swirls around an outer perimeter of a lower hollow cylindrical part of the chamber 30 that is surrounded by an annular compartment 32, as can be seen in FIG. 2, to enhance this desired action and mixing.

Thus, the same or single unit dispenser is capable of producing hot frothed milk or hot non-frothed milk (see FIG.

4) simply by selecting either of two operating modes, using the rotary knob 14 and normally also adjusting the valve 11 to allow milk to flow out of the reservoir at least predominately due only to gravity in the non-frothing mode.

I claim:

1. A single unit milk dispenser for producing hot frothed milk and hot non-frothed milk using milk and steam, the dispenser comprising a reservoir for containing a supply of milk, means for supplying steam under pressure, a first chamber, an adjustable valve to allow a flow milk into the first chamber, a first aperture in the base of the first chamber, a first steam outlet nozzle directed towards the first aperture to blow the milk from the first chamber into an expansion chamber where the milk is frothed by the steam, a second aperture in the base of the expansion chamber leading to a collection chamber for collecting frothed milk that exits from the expansion chamber, and a dispensing outlet at the base of the collection chamber, a flow passage between the adjustable valve and the expansion chamber to allow milk to be supplied from the reservoir into the expansion chamber, a second steam outlet nozzle for supplying steam under pressure directed across the collection chamber above the dispensing outlet to swirl and heat milk passing through the second valve towards the dispensing outlet, means for selectively supplying steam either to the first steam outlet nozzle for providing hot frothed milk at the dispensing outlet or to the second steam outlet nozzle for providing hot-non-frothed milk at the dispensing outlet.

2. A single unit milk dispenser according to claim 1, in which the flow passage inludes the first aperture, the first chamber, and the second aperture.

3. A single unit milk dispenser according to claim 1, in which the second aperture is formed in a raised central part of a closure base plate that tends to cause the frothed milk to swirl around inside the base of the expansion chamber.

4. A single unit milk dispenser according to claim 1, in which the second steam outlet nozzle is mounted next to the first steam outlet nozzle and a flow passage provided between the second nozzle and an aperture in a side of collection chamber.

5. A single unit milk dispenser according to claim 1, in which the aperture in the side of the collection chamber comprises an aperture in a side of a hollow cylinder surrounded by a compartment to allow steam and milk to swirl both around in the collection chamber and in the compartment.

* * * * *